(12) United States Patent
Bachmann Nielsen et al.

(10) Patent No.: US 10,273,413 B2
(45) Date of Patent: Apr. 30, 2019

(54) DIESEL-SOLUBLE LIGNIN OILS AND METHODS OF THEIR PRODUCTION

(71) Applicants: DANMARKS TEKNISKE UNIVERSITET, Kgs. Lyngby (DK); UNIVERSITY OF COPENHAGEN, Copenhagen K (DK)

(72) Inventors: Joachim Bachmann Nielsen, Copenhagen (DK); Anders Jensen, Sarpsborg (NO); Anker Degn Jensen, Kr. Saaby (DK)

(73) Assignees: DANMARKS TEKNISKE UNIVERSITET, Kgs. Lyngby (DK); UNIVERSITY OF COPENHAGEN, Copenhagen K (DK)

( * ) Notice: Subject to any disclaimer, the term of this patent is extended or adjusted under 35 U.S.C. 154(b) by 0 days.

(21) Appl. No.: 15/543,451

(22) PCT Filed: Jan. 13, 2016

(86) PCT No.: PCT/EP2016/050522
§ 371 (c)(1),
(2) Date: Jul. 13, 2017

(87) PCT Pub. No.: WO2016/113280
PCT Pub. Date: Jul. 21, 2016

(65) Prior Publication Data
US 2018/0002607 A1    Jan. 4, 2018

(30) Foreign Application Priority Data
Jan. 13, 2015   (EP) .................................. 15150972

(51) Int. Cl.
*C10G 1/04*    (2006.01)
*C10L 1/02*    (2006.01)
(Continued)

(52) U.S. Cl.
CPC ............... *C10G 1/042* (2013.01); *C10G 3/52* (2013.01); *C10L 1/026* (2013.01); *C10L 1/08* (2013.01);
(Continued)

(58) Field of Classification Search
CPC .. C10G 1/042; C10G 3/52; C10G 2300/1014; C10G 2400/04; C10G 2300/44;
(Continued)

(56) References Cited

U.S. PATENT DOCUMENTS 7,578,927 B2    8/2009  Marker et al.
2011/0119994 A1  5/2011  Hogendoorn et al.
(Continued)

FOREIGN PATENT DOCUMENTS

SU         997441      10/1983
WO       2010094697     8/2010
(Continued)

OTHER PUBLICATIONS

International Search Report for PCT/EP2016/050522, Completed by the European Patent Office dated Apr. 8, 2016, 5 Pages.
(Continued)

*Primary Examiner* — Randy Boyer
*Assistant Examiner* — Juan C Valencia
(74) *Attorney, Agent, or Firm* — Brooks Kushman P.C.

(57) ABSTRACT

Solvent consumption in supercritical ethanol, propanol or butanol treatment of either refined pre-extracted lignin or comparatively impure lignin-rich solid residual from hydrothermally pretreated lignocellulosic biomass can be minimized by conducting the reaction at very high loading of lignin to solvent. Comparatively impure, crude lignin-rich solid residual can be directly converted by supercritical alcohol treatment to significantly diesel-soluble lignin oil without requirement for pre-extraction or pre-solubilization (Continued)

of lignin or for added reaction promoters such as catalysts, hydrogen donor co-solvents, acids, based or H2 gas. O:C ratio of product oil can readily be obtained using crude lignin residual in such a process at levels 0.20 or lower.

12 Claims, 13 Drawing Sheets

(51) Int. Cl.
 C10L 1/08 (2006.01)
 C10G 3/00 (2006.01)
 C10L 1/18 (2006.01)
 C10L 5/44 (2006.01)
 C10L 9/08 (2006.01)
(52) U.S. Cl.
 CPC ............ *C10L 1/1817* (2013.01); *C10L 5/445* (2013.01); *C10L 9/086* (2013.01); *C10G 2300/1014* (2013.01); *C10G 2300/42* (2013.01); *C10G 2300/44* (2013.01); *C10G 2400/04* (2013.01); *C10G 2400/30* (2013.01); *C10L 2200/0438* (2013.01); *C10L 2200/0469* (2013.01); *C10L 2290/02* (2013.01); *C10L 2290/06* (2013.01); *C10L 2290/08* (2013.01); *C10L 2290/26* (2013.01); *C10L 2290/28* (2013.01); *C10L 2290/50* (2013.01); *C10L 2290/542* (2013.01); *C10L 2290/543* (2013.01); *C10L 2290/545* (2013.01); *Y02E 50/10* (2013.01); *Y02E 50/13* (2013.01); *Y02E 50/30* (2013.01); *Y02P 30/20* (2015.11)
(58) Field of Classification Search
 CPC ... C10G 2300/42; C10L 1/1817; C10L 9/086; C10L 5/445; C10L 1/026; C10L 1/08; C10L 2290/542; C10L 2290/06; C10L 2290/02; C10L 2290/545; C10L 2290/08; C10L 2200/0469; C10L 2200/0438
 See application file for complete search history.

(56) References Cited

U.S. PATENT DOCUMENTS

| | | | |
|---|---|---|---|
| 2012/0010318 A1 | 1/2012 | Tan et al. | |
| 2013/0060067 A1* | 3/2013 | Trahanovsky | C07C 29/60 568/386 |
| 2013/0295628 A1* | 11/2013 | Retsina | C08H 8/00 435/160 |
| 2014/0248676 A1* | 9/2014 | Griffin | D21C 11/0007 435/165 |

FOREIGN PATENT DOCUMENTS

| | | |
|---|---|---|
| WO | 2013009419 | 1/2013 |
| WO | 20130135973 | 9/2013 |

OTHER PUBLICATIONS

Cheng et al. Energy and Fuels Sep. 16, 2010, vol. 24, No. 9, pp. 4659-4667, XP055263677, "Highly Efficient Liquefaction of Woody Biomass in Hot-Compressed Alcohol-Water Co-solvents".
Yueyuan et al. Industrial and Engineering Chemistry Research Jan. 11, 2012, vol. 51, No. 1, pp. 103-110, XP055215272, "Novel Method for Production of Phenolics by Combining Lignin Extraction with Lignin Depolymerization in Aqueous Ethanol".
Cheng et al. Polymer Degradation and Stability, Mar. 27, 2012, vol. 97, No. 6, pp. 839-848, XP028421699, "Hydrothermal degradation of alkali lignin to bio-phenolic compounds in sub/supercritical ethanol and waterethanol co-solvent".
Huang et al., CHEMSUSCHEM Aug. 1, 2014, vol. 7, No. 8, pp. 2276-2288, XP055263616, "Catalytic Depolymerization of Lignin in Supercritical Ethanol".
Minami et al. Journal of Wood Science ; Official Journal of the Japan Wood Research Society Apr. 1, 2003, vol. 49, No. 2, pp. 158-165, XP019784458, "Reaction behavior of lignin in supercritical methanol as studied with lignin model compounds".
Tsujino et al. Wood Science and Technology, Dec. 1, 2003, vol. 37, No. 3-4, pp. 299-307, XP055211180, "Reactivity of lignin in supercritical methanol studied with various lignin model compounds".
Xiao et al. Polymer Degradation and Stability, Barking, Jan. 1, 2001, vol. 74, No. 2, pp. 307-319, XP004310455, "Chemical, structural, and thermal characterizations of alkali-soluble lignins and hemicelluloses, and cellulose from maize stems, rye straw, and rice straw".
Zhu et al. Bioresource Technology, Elsevier BV Feb. 1, 2011, vol. 102, No. 3, pp. 2897-2903, XP027582932, "Calculating sugar yields in high solids hydrolysis of biomass".
Nour Eddine El Mansouri et al. BioResources May 1, 2011, pp. 2647-2662, XP055263204, "Characterization of Alkaline Lignins for Use in Phenol-Formaldehyde and Epdxy Resins". https://www.ncsu.edu/bioresources/BioRes_06/BioRes_06_3_2647_ElMansouri_YH_Char_Alkaline_Lignins_PF_Epoxy_Resins_1557.pdf.
Barta et al. Green Chemistry Jan. 1, 2014, vol. 16, No. 1, pp. 191-196, XP055263621, "Depolymerization of organosolv lignin to aromatic compounds over Cu-doped porous metal oxides".
Lehto et al al. Applied Energy 2014. vol. 116, pp. 178-190, "Review of fuel oil quality and combustion of fast pyrolysis bio-oils from lignocellulosic biomass".
Aysu, T. et al., Biore-source Technology 2012, vol. 107, pp. 464-470, "Liquefaction of Typha latifolia by supercritical fluid extraction".
Huang, H. et al. Journal of Analytical and Applied Pyrolysis 2013, vol. 102, pp. 60-67, "Thermochemical liquefaction of rice husk for bio-oil production with sub- and supercritical ethanol as solvent".
Alcala et al. Fuel 2013, vol. 109, pp. 417-426, "Upgrading fast pyrolysis liquids: Blends of biodiesel and pyrolysis oil".
Kuznetsov et al. Kinetics and Catalysis 2015, vol. 56, No. 4, pp. 434-441, "Lignin conversion in supercritical ethanol in the presence of solid acid catalysts".
Kim et al. Chemosphere 2013, vol. 93, pp. 1755-1764, "Effects fo various reaction parameters on solvolytical depolymerization of lignin in sub- and supercritical ethanol".
Ye et al. Ind. Eng. Chem. Res. 2012, vol. 51, pp. 103-110, "Novel method for production of phenolics by combining lignin extraction with lignin depolymerization in aqueous ethanol".
Kleinert et al. Cellulose Chem. Technol. 2011, vol. 1-2, pp. 3-12, "Developing solvolytic conversion of lignin-to-liquid (LtL) fuel com-ponents: Optimization of quality and process factors".
Kleinert et al. Energy and Fuels 2008, vol. 22, pp. 1371-1379, "Towards a lignincellulosic biorefinery: Direct one-step con-version of lignin to hydrogen-enriched biofuel".
Guvenatam et al. Catalysis Today 2016, vol. 259 pp. 460-466, "Lewis-acid catalyzed depolymerization of Protobind lignin in supercritical water and ethanol".
Barta et al. Green Chem., 2010, vol. 12, pp. 1640-1647, "Catalytic disassembly of an organosolv lignin via hydrogen transfer from supercritical methanol".
Yuan et al. Bioresource Technology 2010, vol. 101, pp. 9308-9313, "Hydrolytic degradation of alkaline lignin in hot-compressed water and ethanol".
Miller et al. Fuel 1999, vol. 78, pp. 1363-1366, "Batch microreactor studies of lignin and lignin model compound depolymerization by bases in alcohol solvents".
Mortensen 2013 (PHD Dissertation), 254 Pages, "Catalytic conversion of bio-oil to fuel for trans-portation".
Channiwala et al. Fuel 2002, vol. 81, pp. 1051-1063, "A unified correlation for estimating HHV of solid, liquid and gaseous fuels".
Alvira, P., et al. Bioresource Technology 2010, vol. 101, pp. 4851-4861, "Pretreatment technologies for an efficient bioethanol production pro-cess based on enzymatic hydrolysis: A review".

(56) References Cited

OTHER PUBLICATIONS

Huang et al. Green Chem. 2015, vol. 14, 11 Pages, "Ethanol as capping agent and formaldehyde scavenger for efficient depolymerization of lignin to aromatics".
Joffres et al. Oil and Gas Science and Technology, Rev. IFP Energies nouvelles 2013, vol. 68, No. 4, pp. 753-763, "Thermochemical Conversion of Lignin for Fuels and Chemicals: A Review".
Azadi et al. Renewable and Sustainable Energy Reviews 2013, vol. 21, pp. 506-523, "Liquid fuels, hydrogen and chemicals from lignin: A critical review".
Kuznetsov et al. Kinetics and Catalysis 2013, vol. 54, No. 3, pp. 344-352, "Integrated Catalytic Process for Obtaining Liquid Fuels from Renewable Lignocellulosic Biomass".
Chen et al. J. of Supercritical Fluids 2014, vol. 95, pp. 387-393, "Upgrading of bio-oil in supercritical ethanol: Catalysts screening, solvent recovery and catalyst stability study".
Kleinert et al. Journal of Analytical and Applied Pyrolysis 2009, vol. 85, pp. 108-117, "Optimizing solvolysis conditions for integrated depolymerisation and hydrodeoxygenation of lignin to produce liquid biofuel".
Barth et al. Chem. Eng. Technol. 2008, vol. 31, No. 5, pp. 773-781, "Motor Fuels From Biomass Pyrolysis".
Kleinert et al. Chem. Eng. Technol. 2008, vol. 31, No. 5, pp. 736-745, "Phenols from Lignin".
Kumar et al. Ind. Eng. Chem 2009, vol. 48, pp. 3713-3729, "Methods for Pretreatment of Lignocellulosic Biomass for Efficient Hydrolysis and Biofuel Production".

\* cited by examiner

DIESEL-SOLUBLE LIGNIN OILS AND METHODS OF THEIR PRODUCTION

CROSS-REFERENCE TO RELATED APPLICATION

This application is the U.S. national phase of PCT Application No. PCT/EP2016/050522 filed on Jan. 13, 2016, which claims priority to EP Patent Application No. 15150972.6 filed on Jan. 13, 2015, the disclosures of which are incorporated in their entirety by reference herein.

FIELD OF THE INVENTION

The invention relates to lignin-derived liquid fuels, and in particular to oils that are soluble in diesel fuels and methods of their production. In particular, residual lignin from a lignocellulosic biomass refinery process is subject to treatment in supercritical ethanol, propanol or butanol, under conditions sufficient to provide a combustible oil that is significantly soluble in diesel and marine diesel oil, without reliance on added reactions promoters such as catalysts, acids, bases or hydrogen gas ($H_2$). In particular either pre-extracted lignin or crude residual lignin are subject to treatment in supercritical ethanol, propanol or butanol at very high loading of lignin in solvent so as to minimize solvent consumption.

BACKGROUND OF THE INVENTION

Development of technologies for utilisation of plant biomass to replace petroleum as a precursor for fuels and chemical products has recently become commercially attractive. In fact, lignocellulosic biomass processing has become a central focus in ongoing efforts to develop sustainable economies and ameliorate global climate change arising from greenhouse gas emissions.

Utilisation of lignocellulosic biomass in liquid fuels has attracted particular attention. A variety of schemes for this have been proposed. In some systems, whole plant biomass is subject to pyrolysis at temperatures between 500 and 700° C. to produce a combustible bio-oil comprising degradation products derived from lignin, cellulose and hemicellulose. See e.g. Lehto et al. 2014. In other systems, whole plant biomass is extracted in solvents such as water, alcohols or water-alcohol mixtures, typically at supercritical temperature and pressure conditions. See e.g. Aysu et al. 2012; Huang et al. 2013. The extracted, degraded material similarly comprises a combustible liquid fraction. In still other systems, plant biomass is processed using a so-called "biorefinery" approach, which seeks to optimise commercial utilisation of the various different chemical components of the feedstock. The carbohydrate polymers cellulose and hemicellulose are transformed into monomeric sugars which can then be fermented to a variety of different end products such as fuel ethanol or fatty precursors of bio jet-fuel. The lignin component is then recovered as a residual or "waste" product. In cellulosic ethanol biorefineries, which are already commercially viable, fermentable sugars are produced by enzymatic hydrolysis of cellulose and hemicellulose and then fermented to ethanol, which can be used directly as liquid fuel or blended into gasoline. The lignin component is then recovered as a residual, either from enzymatic hydrolysate, from fermentation broth before or directly after distillation of ethanol, or after anaerobic digestion of distillery vinasse.

Lignocellulosic biomass such as agricultural wastes and so-called "fuel grasses" comprise a significant percentage of lignin, typically between 15-35% by weight. Native lignin, which is intricately associated with cellulose and hemicellulose strands, is a complex, hydrophobic, branched, highly cross-linked, amorphous biopolymer formed by oxidative coupling of "lignol" phenyl-propanoid monomers—p-coumaryl alcohol, coniferyl alcohol and sinapyl alcohol. Lignin also typically comprises covalently attached carbohydrate moieties. The number-average molecular weight of native lignins typically falls within the range 7500-15000. In cellulosic ethanol biorefineries, the biomass feedstock is typically subject to some form of pretreatment in order to improve accessibility of cellulose strands to productive enzyme binding. Pretreatment typically involves heating to temperatures above 150° C. and causes a partial de-polymerisation of lignin such that the number-average molecular weight is reduced to between about 1500 and 8000.

Commercial viability of a cellulosic ethanol biorefinery can turn critically upon the economic value obtained from residual lignin. Simply drying residual lignin and using it as a solid fuel provides a comparatively low value lignin product. Higher value can be obtained where residual lignin is converted into a liquid fuel, particularly where the liquid fuel can be blended into diesel fuels.

Lignin fuels are especially valuable when they are suitable for blending with marine diesel, which comprises a greater percentage of heavy oils. Many countries have imposed restrictions on permissible sulphur remissions from marine transport. Ordinary, low-grade fuel oils typically used in container shipping have high sulphur content, 2% by weight or more. Demand is accordingly increasing for higher quality, low-sulphur marine diesel fuels. Lignin residual from a cellulosic ethanol biorefinery can normally be obtained having very low sulphur content. Liquid fuel derived from such lignin residual can be advantageously used as a low-sulphur blend in marine diesel, analogous to use of fuel ethanol as a blend in gasoline.

Biomass pyrolysis oils and crude liquid fuels derived from lignin can be used as diesel blend fuels through use of emulsifiers, see e.g. Martin et al. 2014, or in some cases co-solvents such as alcohols or tetrahydrofuran, typically used in large quantity see e.g. Alcala and Bridgwater 2013; Yaginuma et al. 2001; WO2013/009419. However, reliance on emulsifiers and co-solvents increases process cost and complexity, especially when used in large quantity. It is commercially advantageous to produce a lignin-derived liquid fuel that is, itself, directly soluble in diesel, and particularly in marine diesel. But this has proved difficult to achieve, especially with lignin residual from a cellulosic ethanol biorefinery. This material is typically less than 75% pure, further comprising salts, residual carbohydrate and so-called "pseudo-lignin" (chemical by-products of pretreatment processes).

De-polymerisation at high temperatures is generally adequate to convert solid residual lignin into a combustible liquid. But in order for lignin-derived liquid fuels to be diesel-soluble, the oxygen content of the product oil in hydroxyl, ether, ketone and aldehyde groups should be substantially reduced compared with the lignin starting material. Reduction of oxygen content is associated with an increase in hydrogen content. Native lignin residual from a biomass refinery process typically has a molecular O:C (oxygen:carbon) ratio of between 0.30 and 0.75 and an H:C ratio of between 1.1 and 1.3. In order for lignin-derived oils to become substantially soluble in marine diesel, the O:C ratio of the product oil should generally be reduced to levels of 0.20 or less. To achieve such low levels, the O:C ratio of the lignin starting material should typically be reduced by at least 50%, and the H:C ratio should typically be increased to greater than 1.5.

In order to achieve substantial de-oxygenation of lignin-derived liquid fuels, it has previously been considered necessary to employ a commercially disadvantageous separate de-oxygenation step or a reaction promoter added during depolymerisation. See e.g. WO2010/094697 [formic acid reaction promoter added to de-polymerisation reaction with lignin residual]; US2012010318 [separate catalytic hydrotreatment step for reduction of oxygen content in heavy pyrolysis bio-oil]; WO2013/135973 [separate multi-stage pressure and heat treatment for deoxygenation of pyrolysis bio-oil]; US20110119994 [separate catalytic hydrotreatment of pyrolysis bio-oil]; U.S. Pat. No. 7,578,927 [separate catalytic hydrotreatment of pyrolysis bio-oil].

One approach to de-polymerisation is solvolysis of residual lignin in supercritical alcohol or alcohol-water mixtures. For review, s Wang et al. 2013. However this approach has been reported previously only using heavily processed and comparatively pure lignin material such as Kraft lignin from pulp and paper processing, which has been solubilised and partially derivatised, or lignin that was previously extracted using alkali or "organosolv" processes. Furthermore, in prior art processes, substantial reductions in O:C ratio could be obtained using supercritical ethanol solvolysis of lignin material only where reaction promoters such as $H_2$ gas, acids, bases, hydrogen donor co-solvents such as formic acid and/or catalysts such as metal oxides or formic acid were added to the reaction. See e.g. Guvenatam et al. 2016 [alkali lignin w/catalyst]; Kuznetsov et al. 2015 [alkali lignin w/catalyst]; Huang et al. 2014 [alkali lignin w/catalyst]; Kim et al. 2013 [organosolv lignin w/$H_2$ gas]; Cheng et al. 2012 [Kraft lignin w/$H_2$ gas]; Ye et al. 2012 [organosolv lignin from enzymatically hydrolysed corn stover w/$H_2$ gas]; Kleinert et al. 2011 [alkali and organosolv lignin w/formic acid]; Kleinert and Barth 2008 [alkali lignin w/formic acid].

Lignin material that has been previously extracted is typically chemically altered, substantially de-polymerized, and more readily soluble in alcohol solvents. In contrast, residual lignin from a cellulosic ethanol biorefinery process is less chemically altered, less readily soluble and comparatively impure. We have discovered that this comparatively impure solid lignin residual can be directly converted into a significantly diesel-soluble liquid fuel using solvolysis in supercritical ethanol, without requirement for any pre-extraction of lignin content or for any added reaction promoter. By selecting appropriate lignin:solvent ratio, water content, reaction temperature and reaction period for the supercritical alcohol treatment, product oils can be obtained using such a process that have O:C ratios of 0.20 or less. Very surprisingly, supercritical alcohol treatment of either crude lignin residual or refined pre-extracted lignin can be advantageously conducted at much higher loading of lignin in solvent than has previously been contemplated, thereby minimizing solvent consumption.

DETAILED DESCRIPTION OF EMBODIMENTS

Figure 1:
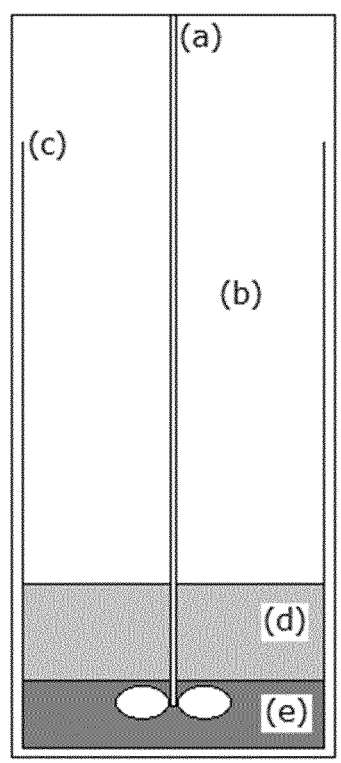
FIG. 1. Experimental batch solvolysis reactor.

In some embodiments, the invention provides a method for processing lignin comprising the steps of:
(i) providing pre-extracted lignin or lignin-rich solid residual from lignocellulosic biomass feedstock that has been hydrothermally pre-treated and subsequently subjected to cellulase enzyme hydrolysis, and
(ii) subjecting the pre-extracted lignin or lignin-rich solid residual to treatment in supercritical ethanol, propanol or butanol at a temperature of 300° C. or greater and at a ratio of solid to solvent of 0.25 or greater,
wherein the supercritical ethanol, propanol or butanol treatment is conducted using solvent comprising some fraction of solvent recycled from previous supercritical treatment reactions.

In some embodiments the invention provides a process for production of liquid lignin fuel comprising the steps of:
(i) providing lignin-rich solid residual from lignocellulosic biomass feedstock that has been hydrothermally pre-treated and subsequently subjected to cellulase enzyme hydrolysis,
(ii) subjecting the lignin-rich solid residual to treatment in supercritical ethanol, propanol or butanol in the absence of an effective amount of added reaction promoter; and
(iii) recovering liquid product from the alcohol reaction mixture as a mixture of heavy liquid fraction having boiling point above 120° C. and one or more light fractions having boiling point beneath 120° C.,
wherein the water content, w/w ratio of solid to solvent, temperature and reaction period for the treatment are selected so as to produce a heavy liquid fraction having O:C ratio of 0.20 or less.

In some embodiments, the invention provides a liquid lignin fuel produced by methods of the invention. In some embodiments, the invention provides a lignin-diesel fuel comprising a blend of diesel oil with between 1% and 25% by weight of a liquid lignin fuel produced by methods of the invention. In some embodiments, the invention provides a low-sulphur marine fuel comprising a blend of marine diesel oil (MDO) with between 1% and 25% by weight of a liquid lignin fuel produced by methods of the invention.

As used herein the following terms have the following meanings:

"Added reaction promoter" refers to reaction promoter material other than solvent and pre-extracted lignin or lignin-rich solid residual which is introduced into the solvolysis mixture.

"Reaction promoter" as used herein can include substances that are partially consumed as reactants. Specifically, the term "reaction promoter" refers to a substance other than primary solvent which either acts as a hydrogen-donor reactant in hydrogenation of lignin residual during solvolysis, or which catalyses hydrogen-donor activity of the primary solvent or a co-solvent. "Catalysts" may include supported or unsupported reduced metal or transition metal oxides. Reactions promoters may include any one or more of a hydrogen donor co-solvent, a catalyst, hydrogen gas ($H_2$), acids or bases added either alone or in combination to improve yields or product properties.

"Conversion yield" refers to the yield of product oil obtained from lignin-rich solid residual determined as the ratio between (mass of heavy liquid fraction recovered)/(mass of dry ash-free added dry matter of lignin residual)×100%.

"Diesel oil" refers to a compression ignition fuel well known in the art comprising fractional distillates of petroleum fuel oil.

"Distillation of one or more light fractions" refers to either atmospheric or vacuum heating in such manner as to remove and recover solvent and optionally additional light fractions leaving a heavy fraction or product oil having a boiling point greater than 120° C., either with or without insoluble solids.

"Effective amount" of "added reaction promoter" is a quantity of reaction promoter alone or in combination with one or more other reaction promoters sufficient to increase conversion yield or decrease O:C ratio of product oil by at least 15% in relative terms compared with the reaction conducted under equivalent conditions in the absence of added reaction promoter.

"Hydrothermal preteatment" refers to the use of water, either as hot liquid or pressurized steam, to provide thermal treatment of biomass, at temperatures of 120° C. or higher, either with or without addition of acids or other chemicals and with or without explosive release from pre-treatment conditions as obtained in "steam explosion" processes.

"Lignin-rich solid residual" refers to solids comprising lignin obtained from lignocellulosic biomass that has been hydrothermally pretreated and subject to cellulase hydrolysis which solids have not been previously solubilised or extracted. The term "lignin-rich" refers to a total Klason lignin content of 40% by weight or greater. "Klason lignin content" as well as xylan and glucan content are determined according to the method described by Sluiter et al. (2010). "Klason lignin" refers to material that is insoluble in strong sulphuric acid. "Klason lignin" content as measured can include both solid, acid insoluble lignin per se and also a significant proportion of so-called "pseudo-lignin," which is believed to comprise chemical by-products derived from degradation of biomass feedstock during pretreatment.

"Pre-extracted" lignin refers to lignin-rich material other than "lignin-rich solid residual" which is obtained by extraction from a lignocellulosic biomass using methods known in the art including alkali extraction, organosolv extraction, Kraft pulping, sulfite pulping, ammonia extracted lignin, and acid hydrolysis lignin.

"Marine diesel oil" refers to marine fuel oil commonly known in the art. Typically a blend of different fractions from distillation of crude oil selected as to satisfy fuel standards.

"O:C ratio" refers to the ratio of oxygen atoms to carbon atoms in product oil components. O:C ratio is measured by determining weight percentages of nitrogen (N), carbon (C), hydrogen (H) and sulphur (S) in a tested sample using CHNS—O elemental analysis. The oxygen (O) weight percentage is then assumed to account for the remaining weight other than ash content. The weight percentages so determined are then corrected to reflect molar ratios.

"Period" of the supercritical alcohol treatment refers to the residence time of dry matter initially added as pre-extracted lignin or lignin residual in the reaction after reaction temperature is achieved until cooling is initiated. In cases where more than one temperature is desired during the course of the reaction, "reaction temperature" refers to the first temperature set point above 250° C. obtained during the course of the reaction prior to initiation of cooling.

"Product oil" refers to a heavy fraction having boiling point above 120° C. obtained from liquid product of the supercritical alcohol treatment after distillation of one or more light fractions having boiling point beneath 120° C.

"Ratio of solid to solvent" refers to the weight ratio of ash-free dry matter content of pre-extracted lignin or lignin-rich solid residual and weight of added solvent, and may alternatively be referred to as "lignin:solvent ratio." Ash content of pre-extracted lignin or lignin-rich solid residual is determined by burning at 600° C. according to the method for determination of ash in wood described in the Technical Association of Pulp and Paper Industry Standard Method D1102-84. In some cases as with the use of organosolv pre-extracted lignin, the lignin may be pre-dissolved in solvent.

"Soft lignocellulosic biomass" refers to plant biomass other than wood comprising cellulose, hemicellulose and lignin.

"Solubility in marine diesel oil (MDO)" or "solubility in diesel oil" as used herein refers to the percentage by weight of a sample of product oil that dissolves in MDO or diesel oil when blended in a mass ratio of product oil:MDO of 1:9.

"Solvolysis" typically refers to a chemical reaction in which the solvent is also a reactant. As used herein "solvolysis" is achieved where pre-extracted lignin or lignin residual is mixed with ethanol, propanol or butanol and heated to the reaction temperature, whether or not pre-extracted lignin or lignin residual or depolymerised lignin fragments are actually dissolved in "solvent."

"Significantly soluble in marine diesel oil" or "significantly soluble in diesel oil" refers to where at least 20% by weight of a sample of product oil dissolves in a sample of marine diesel oil or diesel oil when blended in a mass ratio of product oil:diesel oil of 1:9.

"Water content" refers to the weight percentage of water in the initial reaction mixture prior to heating, including water content of the solvent and of the pre-extracted lignin or lignin rich residual expressed as a percentage of total mass of solvent and solids. In cases where the reaction is conducted as a continuous process the initial reaction mixture prior to heating refers to the net input of solid and liquid into the system averaged over the reaction period.

In a lignocellulosic biomass biorefinery, lignin-rich solid residual can be obtained after feedstock has been pretreated and then subjected to cellulase enzyme hydrolysis for conversion of carbohydrate polymers to fermentable sugars.

Notwithstanding some variability in composition of native lignin from different plant species, a wide variety of soft lignocellulosic biomass feedstocks can be used to practice methods of the invention, including at least wheat straw, corn stover, corn cobs, empty fruit bunches, rice straw, oat straw, barley straw, canola straw, rye straw, sorghum, sweet sorghum, soybean stover, switch grass, Bermuda grass and other fuel grasses, sorghum bagasse, sugarcane bagasse, arundo, beet pulp, corn fiber, or any combinations thereof.

The feedstock is first subject to pretreatment so as to improve accessibility of cellulose fibers to productive binding by cellulase enzymes. A variety of different pretreatment schemes have been proposed. For review see Alvira et al. 2010. However, lignin residual suitable for use in methods of the invention can be advantageously obtained from feedstocks subjected to hydrothermal pretreatment.

While hydrothermal pretreatment can be conducted in the presence of added acids or bases, these methods are generally less advantageous in producing an optimal lignin residual. Base-supplemented hydrothermal pretreatment leads to a substantial solubilisation of lignin mono- and oligomers, and increases the requirement for deoxygenation and hydrogenation of the product oil derived from the material. Acid-supplemented or "dilute acid" hydrothermal pretreatment typically involves use of sulphuric acid which promotes sulphonate derivatization of residual lignin, which is undesirable both in terms of sulphur content and also O:C ratio of product oil derived from the material.

In some embodiments hydrothermal pretreatment is conducted at initial pH within the range 4.0-9.0. This typically provides a pretreated feedstock which, after enzymatic hydrolysis, will yield a suitable underivatized solid lignin residual having sulphur content less than 0.3% by dry weight.

An often used parameter of hydrothermal pretreatment "severity" is "Ro," which is typically referred to as a log value. Ro reflects a composite measure of pretreatment temperature and reactor residence time according to the equation: $Ro = tEXP[T-100/14.75]$ where t is residence time in minutes and T is reaction temperature in degrees centigrade. In some embodiments, hydrothermal pretreatment is conducted to severity log Ro at least 3.4, or between 3.5 and 4.0, or between 3.8 and 4.2.

In some embodiments, the pretreated feedstock is subjected to enzymatic hydrolysis using cellulase enzyme activities according to methods well known in the art. Cellulase hydrolysis may be provided by enzyme-secreting organisms, or through addition of isolated enzyme mixtures. Typically the composition of "cellulase" enzyme mixtures include a variety of different activities, including exoglucanases, endoglucanases, endoxylanases, xylosidases, acetyl xylan esterases and beta glucosidases. Such isolated enzyme mixtures may be prepared on-site or alternatively a commercially available cellulase preparation optimized for lignocellulosic biomass conversion may be used.

Lignin-rich solid residual (also "lignin residual") is typically isolated by a solid-liquid separation step conducted after cellulase hydrolysate of the pretreated feedstock is fermented to produce ethanol or other useful products. When isolated after fermentation, a suitable lignin residual typically has the lowest practicable level of undigested carbohydrate polymers—solid lignin remains associated with some quantity of undigested carbohydrate, such that the combination of glucan and xylan typically comprises between 1% and 25%, or between 2% and 20%, or between 3% and 15% of the lignin residual by weight. In some embodiments, at least 50% by weight of the dry matter content of the lignin-rich solid residual is Klason lignin. The solid-liquid separation step whereby lignin residual is isolated also typically captures, as a contaminant, some quantity of "pseudo-lignin." Solid-liquid separation can be achieved by any suitable method known in the art including screw press, filter press or drum filter separation, decanting or other methods.

The lignin residual can be isolated after fermentation but before recovery of fermentation products or, alternatively, after recovery of fermentation products by distillation or other means. A typical solid-liquid separation using methods well known in the art can produce a suitable lignin residual having water content between 60 and 70% by weight, or between 45% and 55%, or between 35% and 65%.

Lignin residual can alternatively be obtained after anaerobic digestion of vinasse, which is the slurry remaining after recovery of fermentation products. Anaerobic digestion, which provides wastewater treatment so that biorefinery process water can be re-circulated, typically strips away most biological macromolecules that can be digested by the microbial consortium relied upon. In lignin residual recovered after anaerobic digestion, glucan and xylan content can be reduced to less than 0.2% by weight and "pseudo-lignin" content reduced to the lowest practicable levels. In some embodiments, lignin residual may be subjected to drying to reduce water content to levels as low as 20% by weight or less or 10% or less or 5% or less.

It will be readily understood by one skilled in the art that supercritical treatment in ethanol, propanol or butanol generally refers to "solvolysis," that any combination of ethanol, propanol or butanol may be used in any proportions, and that substantial water content may be blended with the primary alcohol solvent. In some embodiments, methods of the invention can be performed as a continuous process. It is quite surprising that crude lignin residual can be converted to substantially diesel-soluble oils using supercritical alcohol treatment without added reaction promoter. The reasons for this are not yet clearly understood. This contradicts prior art teaching that significant reduction of O:C ratio or significant increase in tetrahydrofuran solubility of liquid product obtained from ethanol solvolysis of lignin requires addition of a catalyst. See Huang et al. 2014; Kleinert and Barth 2008; Kleinert et al. 2011; Cheng et al. 2012.

At the end of the supercritical alcohol treatment, liquid product is recovered from the solvolysis mixture. In some embodiments, the solvolysis mixture is first subject to a solid/liquid separation step such as filtration or centrifugation to separate insoluble solids. These solids typically comprise a mixture of char and ash and typically have considerable heating value as a solid fuel. In some embodiments, solids can be separated from liquid product after distillation of one or more light fractions. Liquid product is recovered as a mixture of both heavy fraction having boiling point greater than 120° C. and one or more light fractions having boiling point beneath 120° C. In some embodiments, product oil is recovered from the liquid product as the separated heavy fraction having boiling point greater than 120° C. remaining after distillation of one or more light fractions.

One skilled in the art will, with routine experimentation, readily arrive at a desirable set of process parameters for supercritical alcohol treatment of lignin-rich residual solid from any given biomass feedstock pretreated to any given severity so as to produce a product oil having O:C ratio of 0.20 or less. Typically this can be achieved where water content is within the range 0 to 15 wt %, w/w ratio of solid to solvent is within the range 0.02 to 0.43, or between 0.43 and 0.60, reaction temperature is within the range 325 to 450° C., or between 325 and 425° C. and reaction period is within the range 0 to 8 hours, or between 5 minutes and 4 hours, or between 30 minutes and 2 hours. Initial water content of the supercritical alcohol treatment includes contributions both from water content of the added solvent and from water content of lignin residual. Water content can increase during the course of solvolysis, as the dry matter of the lignin residual undergoes dehydration reactions and as the solvent dehydrates by condensation with itself.

Processes of the invention can be advantageously optimized either to maximize yields of product oil or to minimize consumption of "solvent." In a cellulosic ethanol biorefinery, ethanol is expected to be plentiful and readily available for use as "solvent." However, the market sales price of ethanol is high—often as high or even higher than the price which can be obtained for lignin product oil. Accordingly, minimization of solvent consumption is at least as important commercially as is maximization of yields. Processes of the invention produce not only product oil but also byproduct gas and residual char. The char and gas also have value as fuels. Higher heating values (HHV) are typically in the range 10 to 55 MJ/kg for byproduct gas; 10 to 30 MJ/kg for char; and 25 to 40 MJ/kg for product oil compared with 15 to 25 MJ/kg for dry lignin rich residual. Typically the byproduct gas can be used to support energy demands of the process while char can be sold as solid fuel having higher heating value, and accordingly higher cost per kg, than the lignin residual starting material.

We have discovered that, very surprisingly, solvent consumption using either pre-extracted lignin or crude lignin residual can be minimized in a reaction with extremely high lignin loading—much higher than has previously been contemplated by prior art treatment of pre-extracted lignin with catalysts in supercritical ethanol. In these embodiments which seek to minimize solvent consumption, the reaction is typically run at between 300° C. and 425° C., or between 350° C. and 425° C., with a solid:solvent ratio of 0.25 or greater, or 0.35 or greater, or 0.40 or greater, or 0.50 or greater, or between 0.5 and 0.6, or between 0.6 and 0.75. A lignin:solvent ratio of 0.25 corresponds to a lignin loading of about 5 ml ethanol, propanol or butanol/g residual lignin ash-free dry matter—a level much higher than has been previously reported. See e.g. Guvenatam et al. 2016 (>40 ml ethanol/g alkali lignin); Kuznetsov et al. 2015 (>7 ml ethanol/g alkalai lignin); Kim et al. 2013 (>50 ml ethanol/g organosolv lignin); Ye et al. 2012 (8 ml ethanol/g pre-dissolved organosolv lignin); Barta et al. 2010 (30 ml methanol/g organosolv lignin); Yuan et al. 2010 (9 ml ethanol/g alkali lignin); Kleinert and Barth 2008 (>12 ml ethanol/g alkali lignin); Miller and Trudell 1999 (>10 ml ethanol/g organosolv lignin). In these embodiments, the supercritical alcohol treatment can also be advantageously conducted in the absence of an effective amount of added reaction promoter. In these embodiments with high lignin loading, short reaction periods are typically advantageous, in the range 0 to 4 hours, or between 5 minutes and 30 minutes, or between 30 minutes and 2 hours while water content can be in the range 0 to 15 wt %, or between 4 wt % and 8 wt %. The O:C ratio of product oil in these high lignin loading embodiments is still typically less than 0.20. Even where yields of product oil are comparatively low at high lignin loading and short reaction period, on the order of 25-40% by weight, the process can still be commercially very advantageous where solvent consumption is minimized.

Figure 11:
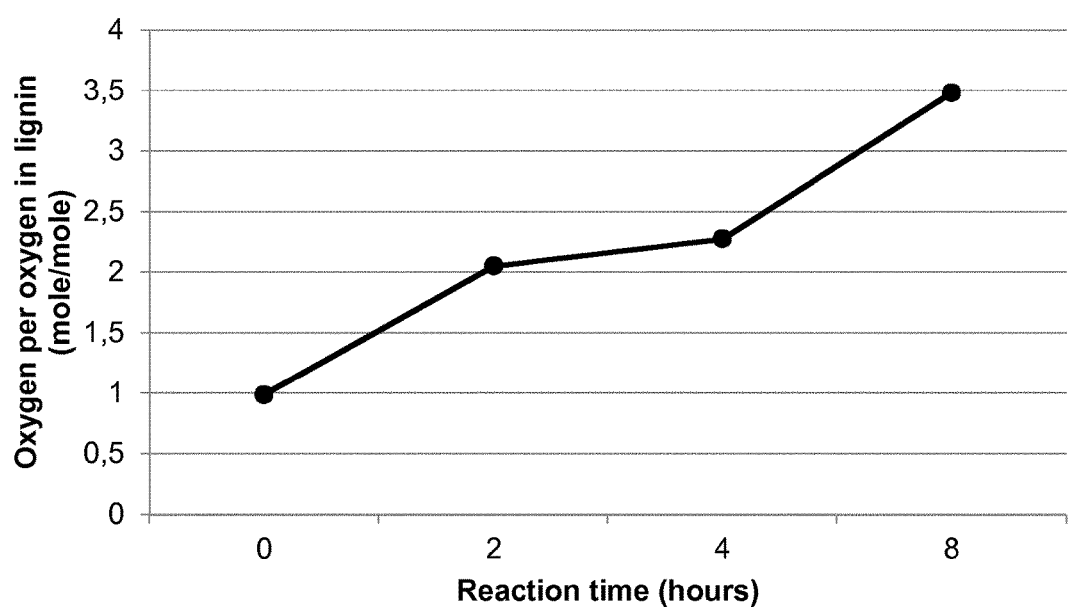
FIG. 11. Molar ratio of final water oxygen to initial lignin oxygen as a function of reaction period.
Figure 12:
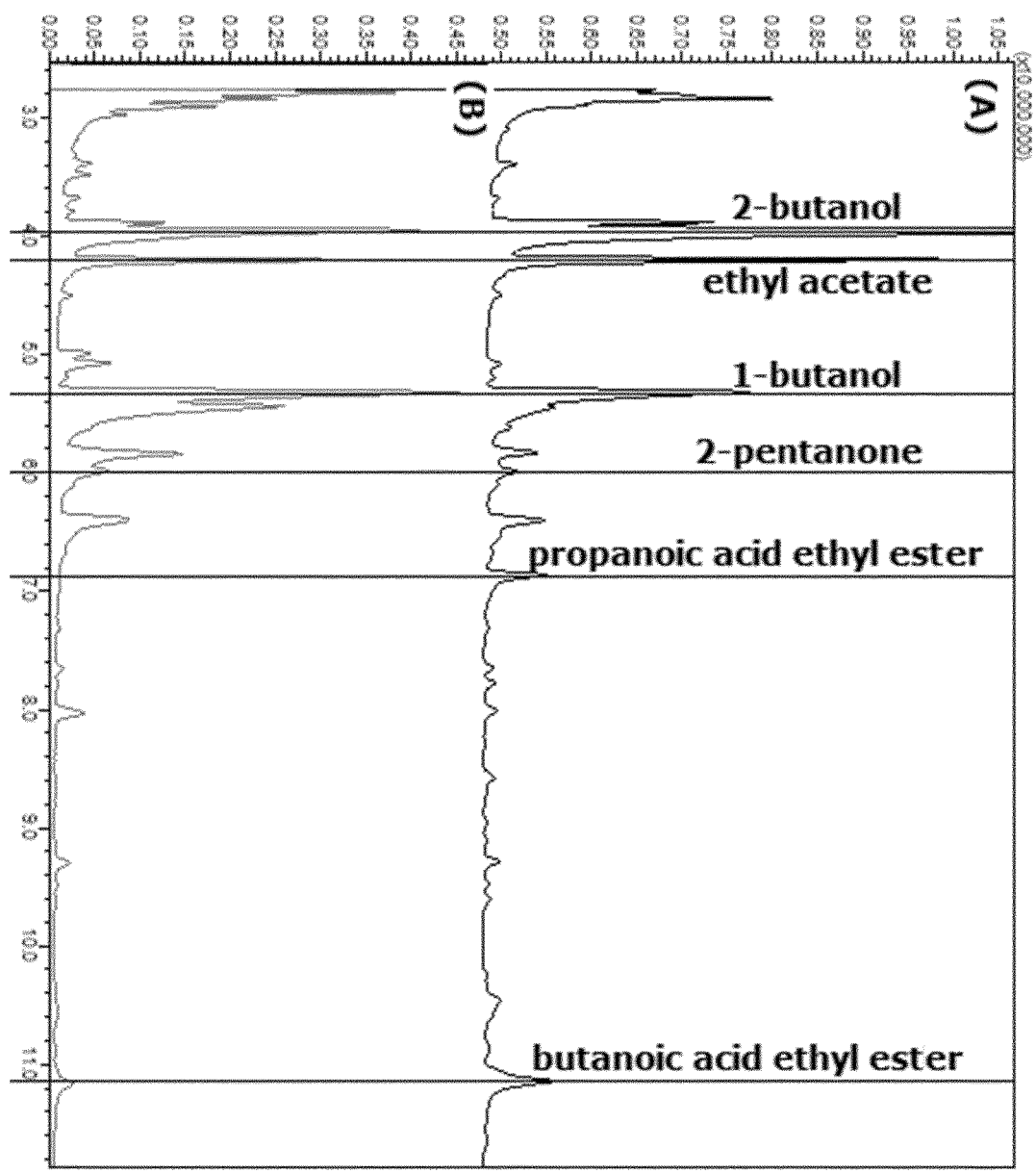
FIG. 12. Solvent degradation reaction products identified in light fraction.

Without wishing to be bound by theory, it appears that the surprising success of the reaction at high lignin loading may be due to a technical effect that has not been previously recognized. The prior art has considered that it was critical that depolymerized lignin fragments be dissolved in solvent in order to achieve an effective "solvolysis" reaction. Studies with the batch reactor shown in FIG. 1, which was used to develop and document the claimed inventive processes, indicate that, especially at high lignin loading, residual lignin remains as a separate phase in supercritical ethanol. This suggests that at supercritical conditions, de-polymerized lignin fragments do not actually dissolve in solvent but simply remain in the lignin phase, especially at high lignin loading. The heavy fraction product oil thus apparently only become dissolved in solvent after conditions are substantially subcritical. The reaction is thus not "solvolysis" as commonly understood in the prior art but rather a reaction between solvent alcohol and lignin occurring within the separate lignin phase or at the phase boundary. A considerable portion of the reactor volume becomes filled with supercritical "solvent" that does not actually interact with lignin substrate. This in turn gives rise to exaggerated solvent consumption arising from non-productive solvent-solvent interactions resulting in solvent degradation, as shown in FIGS. 11 and 12. Non-productive solvent consumption is thus minimized at high lignin loading. It should be noted that this batch reactor system is expected to give somewhat lower levels of product oil yields and higher degree of solvent consumption than would be observed in a continuous reactor system. While the absolute level of solvent consumption is expected to be reduced in a continuous commercial process, the basic technical effect is expected to remain—that solvent consumption can be minimized by minimizing non-productive solvent-solvent interactions, i.e., at high lignin loading.

In some embodiments, it can be advantageous to re-cycle all or part of the alcohol solvent used in supercritical treatment so as to conserve solvent. Accordingly, in some embodiments, supercritical ethanol, propanol or butanol treatment is conducted using solvent comprising some fraction of solvent recycled from previous supercritical treatment reactions. In some embodiments in which lignin-rich residual solid is treated in the absence of an effective amount of added reaction promoter or in which pre-extracted lignin is used, liquid product of the supercritical alcohol treatment can be recovered as a mixture of product oil and light fractions. In some embodiments, liquid product obtained in this manner can be re-introduced into further processing steps using any other methods of the invention either with or without addition of fresh lignin substrate.

In some embodiments using high lignin loading with a solid solvent ratio of 0.25 or greater, any of the reaction parameters described may be used for treatment of either refined pre-extracted lignin or crude lignin-rich solid residual.

In embodiments which seek to maximize yields, at least 40% by weight conversion of lignin-rich solid residual into product oil can typically be achieved. In these embodiments reaction periods can be within the range 0 to 4 hours, or between 30 minutes and 2 hours, or between 2 hours and 4 hours while water content can be within the range 0 to 15 wt %, or between 4 wt % and 8 wt %. Temperature can be within the range 300° C. and 425° C., or between 350° C. and 425° C. Ratio of solid to solvent can be within the range 0.02 to 0.2. Highest yields of product oil are generally obtained at very low solid:solvent ratio on the order of 0.025:1 weight/weight. However, acceptable conversion yields of 40% or greater of product oil having O:C ratio less than 0.20 can still be obtained where the solid:solvent ratio is as high as 0.2.

The supercritical alcohol treatment using lignin-rich solid residual or pre-extracted lignin is surprisingly resilient to problems associated with "slow" heating associated with repolymerisation and other negative effects of radical species, which are widely known in the biomass pyrolysis art. Heating time from room temperature to reaction temperature can take as long as 60 minutes, or more than 15 minutes, or more than 30 minutes. Similarly cooling of the reaction mixture after completion can be accomplished comparatively slowly, taking as long as 60 minutes to return to room temperature, or more than 15 minutes, or more than 30 minutes. This is advantageous in that it permits use of simple heat exchangers for heating and cooling, rather than more expensive capital equipment which would be required for rapid heating and cooling.

The O:C ratio of the product oil obtained as described is 0.20 or less. In some embodiments, the O:C ratio of the product oil is reduced by a factor of at least 50% relative to the O:C ratio of the lignin-rich residual used as starting material. In some embodiments, O:C ratio of the product oil is less than 0.19, less than 0.17, or less than 0.15. In embodiments using lignin rich solid residual, ash content of product oil measured by burning at 600° C. is typically negligible. In these embodiments, sulphur content of product oil is typically below the detection limit for CHNS—O elemental analysis.

Figure 2:
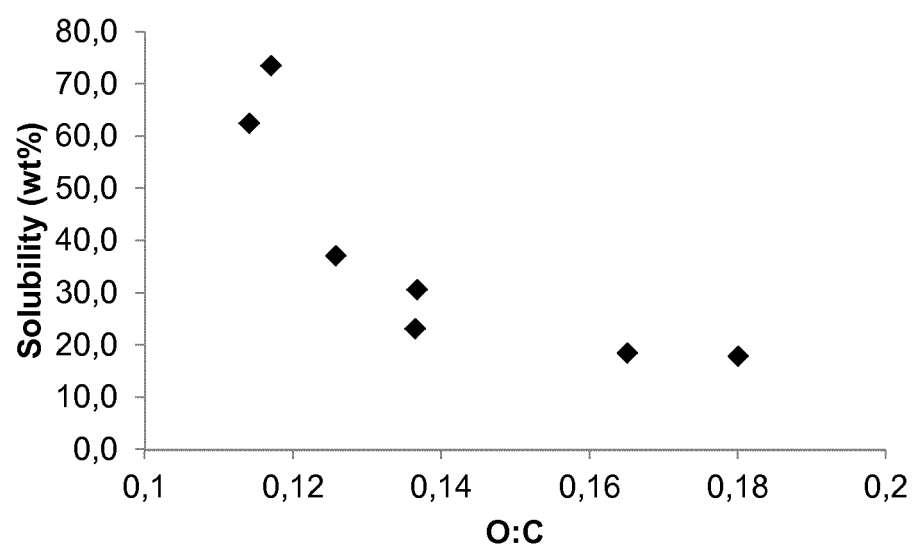
FIG. 2. Solubility of product oil in heptane as a function of O:C ratio.

The solubility of product oil in heptane as a function of O:C ratio is shown in FIG. 2. Heptane was used as a model solvent to approximate the properties of marine diesel oil. As shown, product oil is already significantly soluble where O:C ratio is 0.20 and increases sharply from about 20% to more than 65% as O:C ratio drops beneath 0.15. Product oils obtained using methods of the invention can be advantageously blended with diesel oil or MDO at between 1% and 25% by weight in diesel oil or MDO to produce diesel fuel or low-sulphur marine fuel compositions of the invention. In some embodiments, undissolved material is removed from the blended mixture such that the final blend comprises or consists of between 1% and 25%, or between 1% and 18% by weight of the diesel- or MDO-soluble component of the product oil. The percentage of product oil or soluble component of product oil within a blend is calculated as an additive weight % within the solvent diesel or MDO and not as a percentage of total blend weight. In some embodiments, marine diesel oil used for making low-sulphur marine fuel compositions is a marine distillate fuel meeting the standards specified by the International Organisation for Standardization in ISO-8217, category ISO-F-DMB. In some embodiments, diesel oil used for making lignin oil-diesel fuel compositions is a distillate fuel meeting the standards specified by the International Organisation for Standardization in ISO 9377-2 and/or ISO 16703.

In some embodiments, liquid product or product oil having O:C ratio 0.20 or less can be subsequently subjected to additional processing steps, such as further solvolysis reactions or treatments with heterogeneous catalysts. Liquid product or product oil obtained by methods of the invention from processing of lignin-rich solid residual can be subjected to further upgrading with hydrogen over a heterogeneous catalyst. In some embodiments, the catalytic material can be any commercially available conventional hydrodeoxygenation catalyst known in the art including but not limited to sulfided catalysts. Such catalysts may include but are not limited to sulfided Ni—Mo/$Al_2O_3$.

In some embodiments, a system for continuous upgrading of bio oil such as the one described in Mortensen, P. 2013 (PHD Dissertation) "Catalytic conversion of bio-oil to fuel for transportation" can be used for further processing of liquid product or product oil. For example, in some embodiments, using this system, a packed bed with catalytic material catalyses the hydrodeoxygenation of product oil continuously with a feed supply of liquid product or product oil and hydrogen.

In some embodiments, the combined percent content of carbonyl, ester and carboxylic acid groups of the product oil obtained using methods of the invention determined by $^{13}$C-NMR is beneath 2%.

Example 1. Properties of Lignin-Rich Solid Residual

Lignin rich solid residual for use in experiments was obtained from enzymatically hydrolysed, pretreated wheat straw. Wheat straw was cut into pieces then water added so that dry matter content was approximately 30-40% by weight during pretreatment. Wetted straw was subject to hydrothermal pretreatment using saturated steam at temperatures of between about 180 and 190° C. for about 15-20 minutes, for severity log Ro between about 3.65 and 3.85. The pretreated straw was then separated into a solid fraction and a liquid fraction using a screw press. The fiber fraction was cooled, pH adjusted to approximately 5.0 and then subject to enzymatic hydrolysis at 50° C. for approximately 96 hours using a commercially available cellulase preparation optimised for lignocellulosic biomass conversion. After hydrolysis, the liquefied hydrolysate was subject to fermentation using commercial dry bakers' yeast (*Saccharomyces cerevisiae*) at 37.5° C. for approximately 140 hours. After fermentation ethanol was stripped using a vacuum stripper then concentrated using a rectifying column and a molecular sieve to reach at least 98% ethanol. The bottom product from the distillation column was then separated into a solid fraction and a liquid fraction using a screw press. The solid residual was either dried to a final water content of about 2-5%. CHNS—O content of the dried material was determined using CHNS—O elemental analysis and found to have the composition shown in Table 1.

TABLE 1

CHNS—O composition of lignin-rich solid residual.

| % w/w | C | H | N | S | O | Ash |
|---|---|---|---|---|---|---|
| Lignin residual (dry) | 47 | 4.9 | 1.5 | 0 | 34 | 13 |
| Lignin (corrected for ash content) | 54 | 5.6 | 1.7 | 0 | 39 | |

As shown, the lignin-rich solid residual had an initial ash-free O:C ratio of 0.54. Sulphur content was below level of detection. The carbohydrate and lignin composition of the lignin-rich solid residual was further determined in triplicates using the method of Sluiter et al., 2010 and found to be as shown in Table 2.

TABLE 2

Carbohydrate and lignin composition of lignin-rich solid residual.

| Glucan wt. % | Xylan wt. % | Mannan wt. % | Arabinan wt. % | Galactan wt. % | Acid insoluble lignin wt. % | Ash wt. % | Total wt. % |
|---|---|---|---|---|---|---|---|
| 12.43 | 3.04 | 3.05 | 1.39 | 1.55 | 65.39 | 14.65 | 101.51 |

As shown, the lignin-rich solid residual comprised about 65% by weight of Klason lignin.

Example 2. Experimental Solvolysis Reactor

Solvolysis experiments were conducted in a close sealed Parr reactor with an internal volume of 500 ml. Reactions were conducted by adding up to 40 g of dried lignin-rich solid residual and 100 ml solvent (either methanol, ethanol, 1-propanol, 1-butanol or a mixture of ethanol and water) to a stainless steel liner which was lowered into the Parr reactor prior to sealing the vessel. The reaction could also be conducted using similar quantities of pre-extracted lignin. There is only a small space of up to 2 mm between the liner wall and the Parr reactor wall. The vessel was stirred during the reactions and heated with an external heating mantel for a reaction period of up to 8 h. Heat up time varied between 30-70 minutes depending on the temperature. Reaction period was defined as the duration of the reaction at the desired temperature set point. A non-pressurized inert $N_2$ atmosphere inside the vessel was ensured prior to heat up to temperatures up to 450° C. and the pressure at reaction conditions was autogenous. After the desired reaction period the heating mantel was removed and the reaction vessel cooled to room temperature with ice and an internal cooling coil. The pressure was noted and the gas in the reaction vessel emptied into a balloon for analysis. The vessel was opened and its contents collected. The inside of the liner showed a "clear" line of lignin residue. Condensed liquid was found in small amounts of up to 5 ml in the space between the outside liner wall and the Parr reactor wall. This liquid found outside of the liner was transparent and ranging from having no color to being slightly white and containing no visible solids. Inside the liner a liquid having much darker color up to pitch black was found together with black solids. This difference in the liquid recovered outside the liner compared with the liquid discovered inside the liner appears to indicate the existence of a distinct lignin phase at supercritical reaction conditions. This distinct lignin phase apparently disappears when the reactor is restored to room temperature and atmospheric pressure, at which point the contents of the liner included a single liquid phase of liquid product dissolved in solvent. The vessel contents were filtered in order to separate the liquid fraction from the solid fraction. The weight of the solids was determined by drying for 3 days at 70° C.

The liquid fraction was then evaporated (to remove the solvent) at 5 mbar and 45° C., after which the residual heavy fraction was weighed for determination of oil yield and then subject to CHNS—O elemental analysis for determination of molar O:C ratio. The product oil yield was determined as (mass of heavy liquid fraction recovered)/(mass of dry ash-free lignin rich residual)×100%. The light fraction after evaporation was subjected to Karl Fischer titration to determine the water content and GC-MS/FID to identify light organic reaction products and determine the concentration of alcohol solvent in the light fraction. The light fraction can also be re-used in subsequent supercritical solvent treatments.

The degree of solvent consumption/loss was determined as the difference between quantified mass of alcohol after the reaction and mass of alcohol solvent added prior to reaction. The mass of alcohol solvent after reaction was quantified by assuming that the mass loss due to handling and evaporation of reaction products when opening the reaction vessel, transferring and filtering is solely due to loss of light reaction products (water, solvent and other light organics) and can therefore be added to the total mass of isolated products. It should be noted that this batch reactor system is expected to give somewhat lower levels of product oil yields and higher degree of solvent consumption than would be observed in a continuous reactor system.

FIG. 1 shows a schematic cross sectional view of the inside of the Parr reactor with the liner inserted containing dried lignin-rich residual and solvent prior to heat up (a: Stirrer; b: Inert gas; c: Liner; d: Solvent; e: Dried lignin-rich residual).

Example 3. Solubility of Product Oil in Heptane as a Function of O:C Ratio

Byproduct oil samples were obtained using a variety of different process parameters. Solubility of the product oil in heptane was determined in duplicate by mixing with heptane in a 1:9 ratio in an EPPENDORF™ tube. Heptane was used as a model solvent having similar properties to those of marine diesel oil. After mixing, the tube was centrifuged and the supernatant removed and placed in a separate tube. Both supernatant and insoluble fractions were evaporated under vacuum to remove heptane and the masses of the two fractions were determined. Solubility was determined as the weight of heptane solubilized oil relative to the initial weight of oil. Solubility plotted relative to the molar O:C ratio is shown in FIG. 2.

As shown in FIG. 2, a molar O:C ratio of 0.2 already gives a significant solubility of at least 20%. Molar O:C ratio<0.1 gives near complete solubility of product oil in heptane.

Example 4. Reaction in Different Primary Alcohols with Various Process Parameters Experiments were conducted as described in example 2 using 10 g dried lignin-rich residual (8.5 g ash free dry matter) and pure alcohol (99.9%) solvents: Methanol (79.2 g), ethanol (78.9 g), 1-propanol (80.3 g) and 1-butanol (81 g). The reaction time was 4 hours and the temperature was varied from 300, 350 and 400° C. Varying number of replicates were performed at each point for a total of 18 experiments. Oil yield, molar O:C ratio and solvent consumption were determined as described in example 2.

Figure 3:
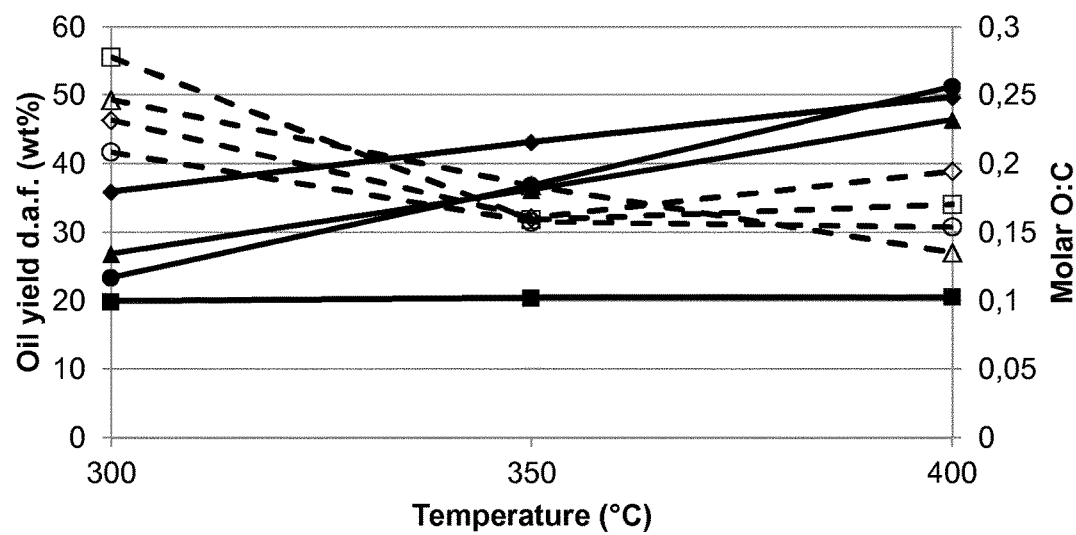
FIG. 3. Yield and O:C ratio of product oil using different primary alcohols as solvent.

FIG. 3 shows, as a function of reaction temperature, the yield (solid lines) and molar O:C ratio (dashed lines) of product oil obtained using different primary alcohols (square: methanol; circle: ethanol; triangle: 1-propanol; diamond: 1-butanol). Methanol as a solvent yields a lower oil yield that is also independent on reaction temperature. With ethanol, 1-propanol and 1-butanol as solvent oil yield is seen to increase with increasing temperature. As shown with ethanol under these conditions O:C ratio of product oil is expected o be beneath 0.2 at a reaction temperature of about 310° C.; with 1-butanol at about 320° C. and with 1-propanol at about 325° C. Methanol does not appear particularly promising as a solvent, which appears to be a consequence of the short alkyl chain length.

Figure 4:
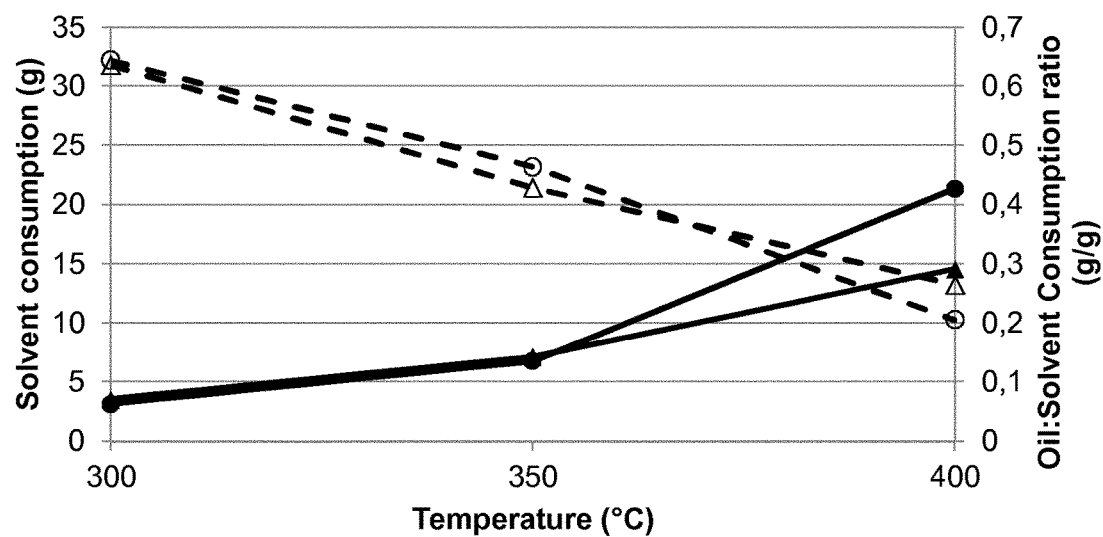
FIG. 4. Solvent consumption and oil produced per g solvent consumed using different primary alcohols as solvent.

FIG. 4 shows, as a function of reaction temperature, solvent consumption (solid lines) and oil produced per g solvent consumed (dashed lines) using different primary alcohols for which reliable data was available (circle: ethanol; triangle: 1-propanol). Both when using ethanol and 1-propanol, solvent consumption is increased as reaction temperature is increased and oil produced per solvent consumed is equally decreased yielding similar values for the two solvents. This indicates that under these conditions, the beneficial effect on oil yield from increasing reaction temperature is offset by an increased solvent consumption such that the net oil produced per solvent consumed is decreased.

Example 5. Effects of Reaction Period with Various Process Parameters

Experiments were conducted as described in example 2 using 99.9% pure ethanol (78.9 g) as solvent. The reaction period was varied from 0-2 hours for treatment of 40 g dried lignin rich residual (34 g ash free dry matter) at 350° C. and the reaction period was varied from 0-8 hours for treatment of 10 g dried lignin-rich residual (8.5 g ash free dry matter) at 400° C. A reaction period of 0 hours refers to the situation where the system was heated to the reaction set point (in about 30-60 minutes) and then cooling initiated immediately thereafter. Varying number of replicates were performed at each point for a total of 10 experiments. Oil yield, molar O:C ratio and solvent consumption were determined as described in example 2.

Figure 5:
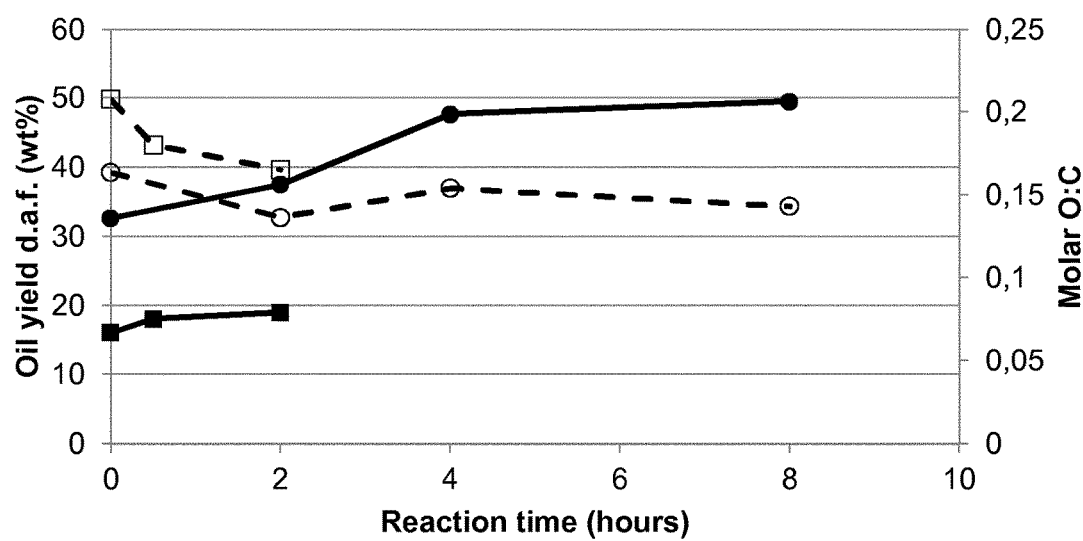
FIG. 5. Yield and O:C ratio of product oil as a function of reaction period.

FIG. 5 shows yield (solid lines) and molar O:C ratio of product oil (dashed lines) as a function of reaction period for two different reaction conditions (squares: 40 g dried lignin rich residual at 350° C.; circles: 10 g dried lignin rich residual at 400° C.). Molar O:C ratio of the oil is reduced as reaction period is increased for high lignin loading under these conditions. An increase in reaction period from 0 to 0.5 hours already decreases the O:C ratio from 0.21 to 0.18 at high lignin loading. For all reaction periods tested, the O:C ratio was below 0.2 at a reaction temperature of 400° C. and using 10 g dried lignin rich residual. At both high and low lignin loading under these conditions oil yield is increased with increasing reaction period.

Figure 6:
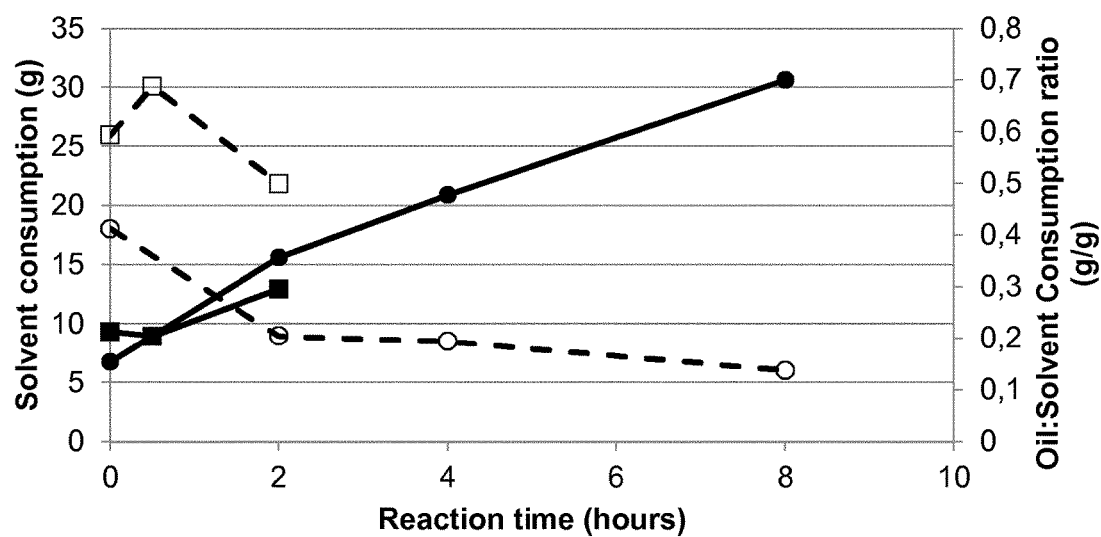
FIG. 6. Solvent consumption and oil produced per g solvent consumed as a function of reaction period.

FIG. 6 shows solvent consumption (solid lines) and oil produced per g solvent consumed (dashed lines) as a function of reaction period for two different reaction conditions (squares: 40 g dried lignin rich residual at 350° C.; circles: 10 g dried lignin rich residual at 400° C.). In both cases solvent consumption increases almost proportionally with increased reaction period while oil produced per g solvent consumed decreases. This further indicates that under these conditions, the beneficial effect on oil yield from increasing reaction period is offset by an increased solvent consumption such that the net oil produced per solvent consumed is decreased.

Example 6. Effects of Lignin Loading with Various Process Parameters

Experiments were conducted as described in example 2 using 99.9% pure ethanol (78.9 g) as solvent and a reaction period of 4 hours. The amount of added lignin-rich residual was varied between 2 g-10 g (1.7 g-8.5 g dry ash-free matter) at 300° C. and the amount of added lignin-rich residual was varied between 0 g-40 g (0 g-34 g dry ash-free matter) at 400° C. Varying number of replicates were performed at each point for a total of 16 experiments. Oil yield, molar O:C ratio and solvent consumption were determined as described in example 2.

The specific ratios of solid:solvent tested were as follows: 0 g dried lignin-rich residual in 78.9 g ethanol=0; 2.0 g dried lignin-rich residual (1.7 g ash free dry matter) in 78.9 g ethanol=0.022; 5 g dried lignin-rich residual (4.25 g ash free dry matter) in 78.9 g ethanol=0.054; 10 g dried lignin-rich residual (8.5 g ash free dry matter) in 78.9 g ethanol=0.108; 20 g dried lignin-rich residual (17.0 g ash free dry matter) in 78.9 g ethanol=0.215; 40 g dried lignin-rich residual (34.0 g ash free dry matter) in 78.9 g ethanol=0.431.

Figure 7:
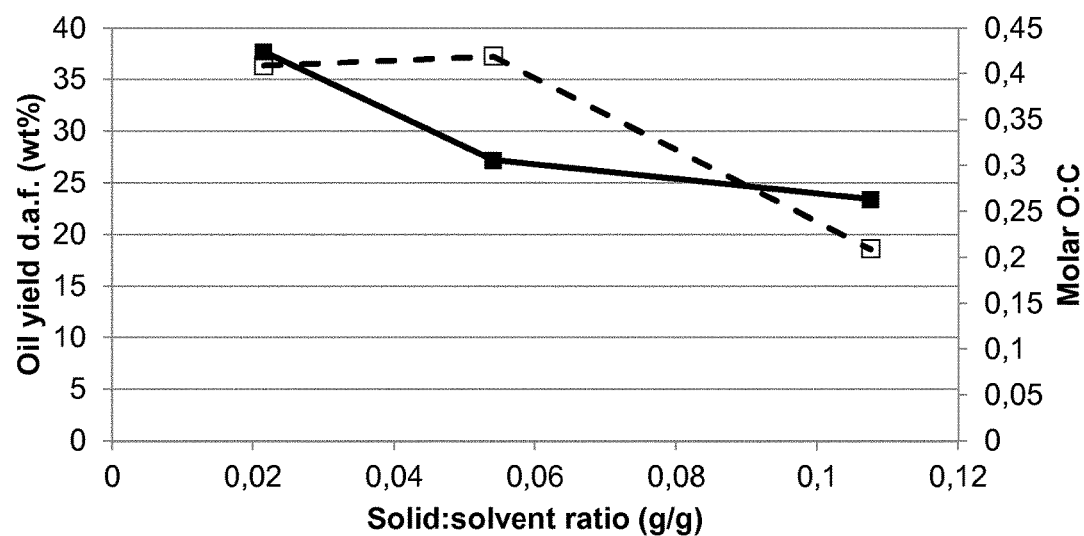
FIG. 7. Yield and O:C ratio of product oil as a function of lignin:solvent ratio.
Figure 8:
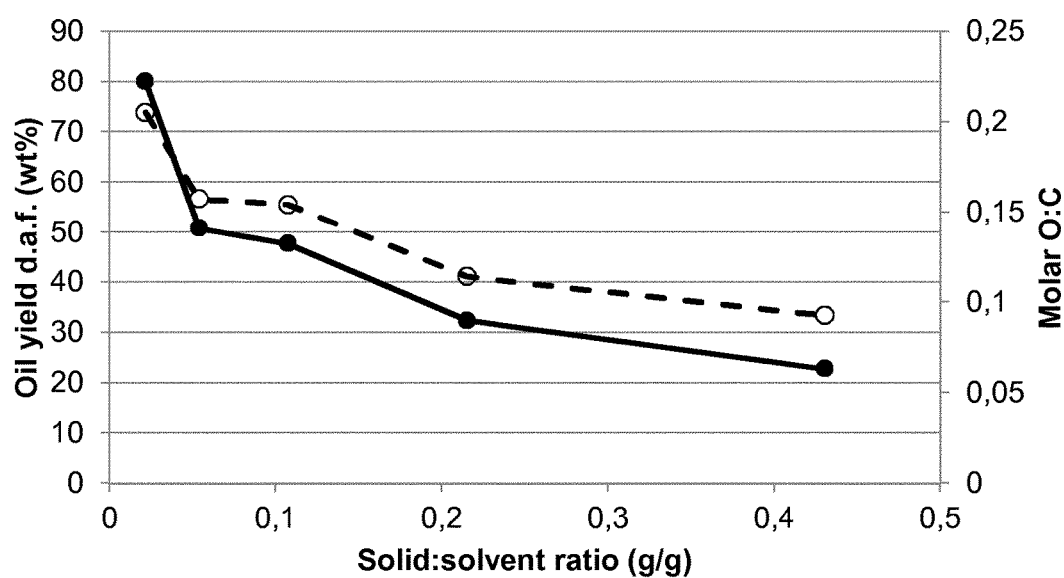
FIG. 8: Yield and O:C ratio of product oil as a function of lignin:solvent ratio.

FIG. 7 shows yield (solid lines) and molar O:C ratio of product oil (dashed lines) as a function of solid:solvent ratio for reaction temperature 300° C. FIG. 8 shows yield (solid lines) and molar O:C ratio of product oil (dashed lines) as a function of solid:solvent ratio for reaction temperature 400° C. As shown under these conditions at 400° C., very surprisingly increased lignin loading exerts a profound effect on O:C ratio dropping from 0.21 at low lignin loading of 0.022 to 0.09 at high lignin loading of 0.43. Comparing with FIG. 2, this very low O:C ratio of 0.09 is expected to provide a solubility in diesel oil above 80%. Oil yield also drops as lignin loading increases. However, this negative effect is offset by the resulting very high solubility in diesel oil. This illustrates the advantages of high lignin loading, which is contrary to suggestions of the prior art. As explained in example 2, apparently a separate lignin phase exists under supercritical solvent conditions. Without wishing to be bound by theory, the extraordinary effect of lignin loading on O:C of the product oil appears to involve deoxygenation reactions within this separate lignin phase or at the phase boundary. It is surprising that such reactions occur. However, in light of the empirical data presented here, one skilled in the art would expect these reactions to be amplified at higher lignin loading.

Figure 9:
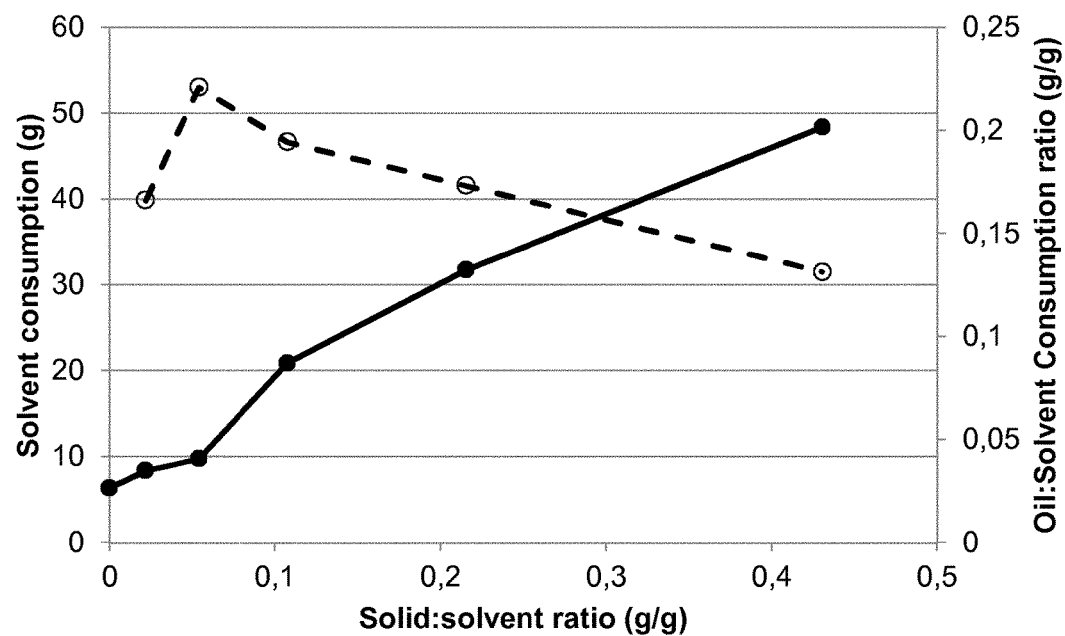
FIG. 9. Solvent consumption and oil produced per g solvent consumed as a function of lignin:solvent ratio.

FIG. 9 shows solvent consumption (solid lines) and oil produced per g solvent consumed (dashed lines) as a function of solid:solvent ratio at a reaction temperature of 400° C. As shown the oil yield per g solvent consumed drops only slightly going from very lignin loading to the highest lignin loading tested. As shown using the batch reactor shown in FIG. 1 solvent consumption at zero g lignin (i.e. solvent blank) was significant due to solvent-solvent reactions. We expect that these deleterious effects of solvent-solvent reactions can be reduced, especially at high lignin loading.

Example 7. Effects of Water Content with Various Process Parameters

Experiments were conducted as described in example 2 using 100 ml total solvent of 99.9% pure ethanol diluted with up to 50 vol % water. The quantity of water added was varied between 0 ml water with 100 ml ethanol and 50 ml water with 50 ml ethanol when conducting a reaction with 10 g lignin-rich residual (8.5 g ash free dry matter) at 300° C. for 4 hours. The quantity of water added was varied between 0 ml water with 100 ml ethanol, 10 ml water with 90 ml ethanol, and 20 ml water with 80 ml ethanol when conducting a reaction with 40 g lignin-rich residual (34 g ash free dry matter) at 350° C. for 0 hours. The quantity of water added was varied between 0 ml water with 100 ml ethanol, 5 ml water with 95 ml ethanol, 10 ml water with 90 ml ethanol, and 50 ml water with 50 ml ethanol when conducting a reaction with 10 g lignin-rich residual (8.5 g ash free dry matter) at 400° C. for 4 hours. Varying number of replicates were performed at each point for a total of 14 experiments. The specific water contents (as % by weight) were calculated based on 2% water content in the lignin-rich residual. Oil yield and molar O:C ratio were determined as described in example 2.

Figure 10:
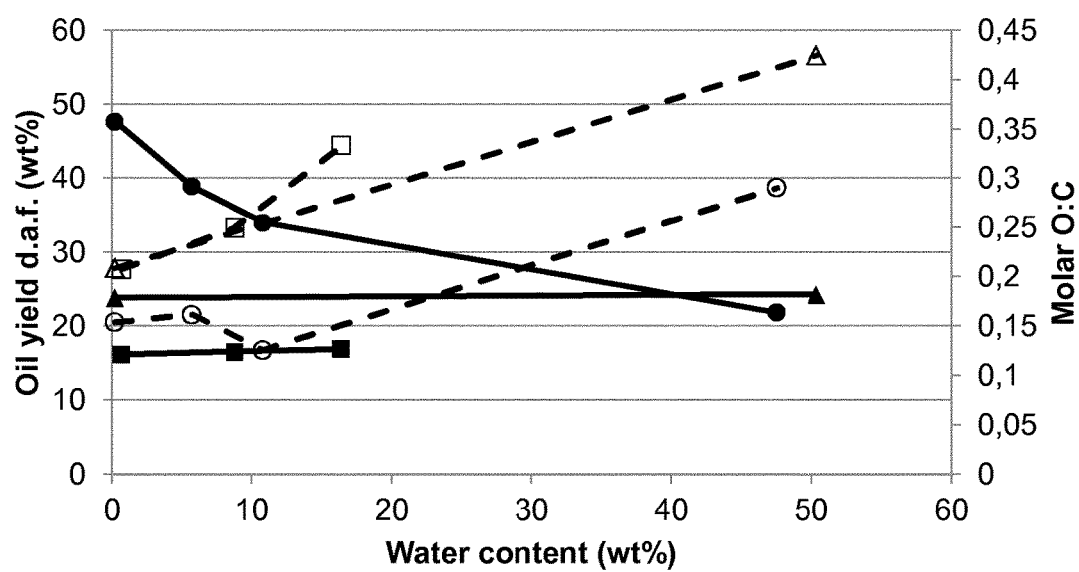
FIG. 10. Yield and O:C ratio of product oil as a function of water content.

FIG. 10 shows yield (solid lines) and molar O:C ratio of product oil (dashed lines) as a function of water content in the solvent at different reaction conditions (triangles: 10 dried lignin rich residual at 300° C. for 4 hours; squares: 40 g dried lignin rich residual at 350° C. for 0 hours; circles: 10 g dried lignin rich residual at 400° C. for 4 hours). As shown for the conditions tested increasing water content is deleterious for both O:C ratio and yield of product oil. In order to obtain a product oil with an O:C ratio of 0.2 or less it is generally advisable to maintain a water content below about 15 wt %.

Example 8. Reaction Products of Solvent Degradation

Experiments at 400° C. were conducted as described in example 5. An experiment was also conducted with no lignin-rich residual added at 400° C. as described in example 6. The amount of water formed and identification of light organics other than solvent were determined as described in example 2.

FIG. 11 shows the molar ratio of oxygen present in water observed at the end of the reaction per mole oxygen initially present in lignin-rich residual, expressed as a function of reaction period for experiments carried out at 400° C. While a value less than 1 is not clearly interpretable, a value above 1 clearly indicates that some observed water must have been formed from reactions involving the solvent. As shown observed water oxygen per mole initial lignin oxygen rises sharply with increasing reaction time. For example, after a reaction period of 8 hours observed water oxygen per mole initial lignin oxygen reaches a value of 3.5. This indicates that after 8 hours at least 70% of water formed during the reaction was derived from deoxygenation of the solvent.

FIG. 12 shows the organic reaction products in the light fraction as detected by GC-MS for two different experiments conducted at 400° C. with a reaction time of 4 hours (top (A): with 10 g lignin-rich residual added; bottom (B): solvent blank without addition of lignin-rich residual). Some of the identified species have been highlighted for reference. The referenced species identified in the solvent blank (B) are expected decomposition/reaction products of ethanol. As shown, these same species are identified in the corresponding reaction in which dried lignin rich residual was included (A). This indicates that, using the batch experimental solvolysis reactor shown in FIG. 1 at the tested experimental conditions, considerable quantities of solvent are consumed non-productively through solvent degradation reactions.

Example 9. Effect of Ethanol Solvolysis Temperature on O:C Ratio, Oil Yield and Solvent Consumption Experiments were conducted as described in example 2 using 99.9% pure ethanol (78.9 g) as solvent and with a reaction time of 4 hours. The reaction temperature was varied from 250-450° C. for experiments with the addition of 10 g dried lignin rich residual (8.5 g ash free dry matter) and the reaction temperature was varied from 300-450° C. for experiments with the addition of 2 g dried lignin rich residual (1.7 g ash free dry matter). Varying number of replicates were performed at each point for a total of 18 experiments. Oil yield and molar O:C ratio were determined as described in example 2.

Figure 13:
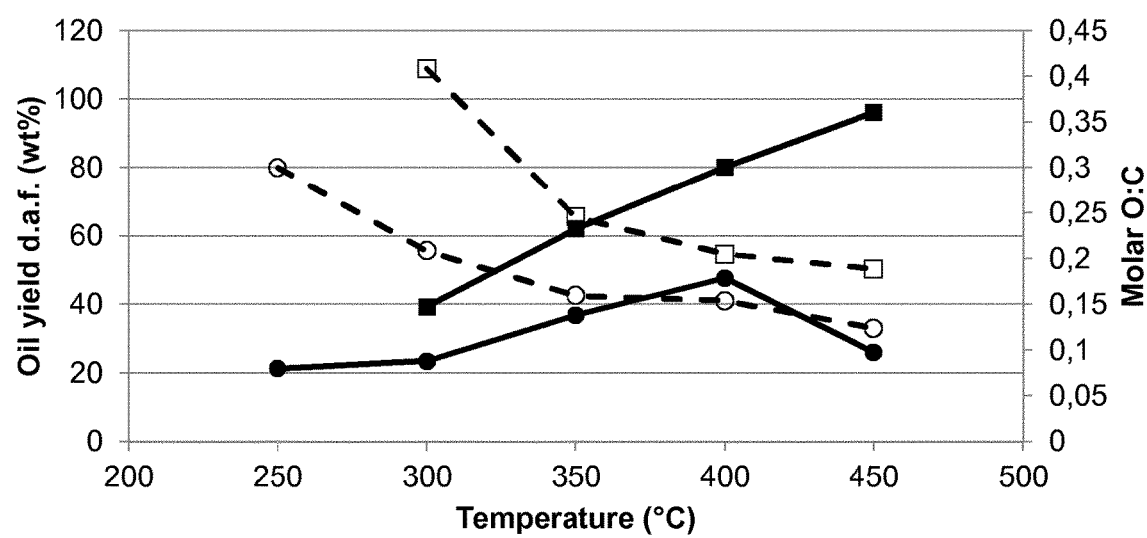
FIG. 13. Yield and O:C ratio of product oil as a function of reaction temperature.

FIG. 13 shows yield (solid lines) and molar O:C ratio of product oil (dashed lines) as a function of reaction temperature at two different loadings of dried lignin rich residual (squares: 2 g; circles: 10 g). As shown in general under the conditions tested both oil yield and O:C ratio is improved as reaction temperature is increased. As shown O:C at higher lignin loading of 10 g is improved relative to lower lignin loading of 2 g consistent with the improved O:C at higher loading as described in example 6. In general temperatures above 400° C. appear less advantageous, especially at higher lignin loading.

Example 10. Compositional Properties of Product Oil

The distribution of carbon functionalities in product oil was determined using $^{13}$C-NMR. One or two drops of product oil were dissolved in 600 μL CDCl$_3$ and the spectra were recorded on a 600 MHz Bruker Avance III instrument with a standard Bruker $^{13}$C-NMR pulse sequence. The spectra were phase and baseline corrected before integration. Integration was made in the regions>200 ppm (carbonyl), 180-160 ppm (esters and carboxylic acids), 160-100 ppm (aromatic and double bonds), 100-60 (oxygenated sp$^3$ carbon (alcohols etc.)), 60-0 ppm (aliphatic carbon) in order to characterize the product oil. The total number of carbons was set to be 100. The mean values and standard errors of the means of percent of carbon atoms falling into each of the respective categories determined using 13 samples obtained under various process conditions are shown in Table 3.

TABLE 3

| Compositional properties of product oil | |
|---|---|
| Chemical shift (ppm) | Carbon % +/− standard mean error |
| >200 (carbonyl) | 0.6 +/− 0.06 |
| 180-160 (esters and carboxylic acids) | 0.9 +/− 0.1 |
| 160-100 (aromatic and double bonds) | 27 +/− 1.1 |
| 100-60 (oxygenated sp$^3$ carbon (alcohols etc.)) | 6 +/− 0.5 |
| <60 (aliphatic carbon) | 65 +/− 0.8 |

As shown, the percent content of carbonyl, ester and carboxylic acid groups of the product oil is quite low, beneath 2%. This indicates that the product oil is long term stable and is less oxidized than a typical pyrolysis oil.

Example 11. Heating Value of Product Oil and Byproducts

An experiment was conducted at 350° C. with a reaction period of 2 hours as described in example 5. The composition of formed gas was quantified using GC-TCD and the higher heating value (HHV) was determined as the sum of weighted combustion enthalpies of each gas component. The elemental composition of the dried solid fraction isolated after the experiment was determined similarly to the elemental composition of the oil as described in example 2. The ash content of the formed dried solids was quantified using the standard test method for determination of ash in wood described in the Technical Association of Pulp and Paper Industry Standard Method D1102-84. The higher heating value of both the product oil and the dried solid product was determined by calculation using the method of Channiwala and Parikh, 2002. The HHV of the oil, solid product and formed gas were 34.5 MJ/kg, 24.2 MJ/kg and 20.1 MJ/kg respectively.

Example 12. Further Processing of Product Oil

Experiments were conducted at 350° C. as described in example 5 and the oil obtained after a reaction period of 0 hours was used for further processing. 5.5 g of product oil was isolated of which 5.3 g was subjected to further solvolysis in 99.9% pure ethanol (78.9 g) at 350° C. for 2 hours similar to the processing of 40 g dried lignin rich residual described in example 5 also at 350° C. for 2 hours. The further processed product oil was then isolated by the process described in example 2 yielding 4.2 g oil with a molar O:C ratio of 0.12. This O:C ratio is significantly lower than that of the oil that comes from processing 40 g of the dried lignin rich residual for 2 hours at 350° C. as described in example 5 which yielded an oil having an O:C ratio of 0.17.

Example 13. Addition of an Effective Amount of Reaction Promoter

Experiments were conducted for 4 hours at 400° C. as described in example 2, except that a quantity of lignin-rich residual sufficient to provide 8.5 g ash free dry matter was used either in the presence or absence of added reaction promoter. In experiments with no added reaction promoter, reaction heat-up to temperature was conducted in a non-pressurised inert $N_2$ atmosphere. In experiments with added $H_2$, the vessel was pressurised with 40 bar hydrogen prior to heat-up. In experiments with addition of solid catalyst 4 g was added of 5 wt % $Ni/Al_2O_3$. The catalyst was prepared from nickel nitrate in a known aqueous concentration poured over alumina powder followed by oven drying at 70° C. for 24 hours. The catalyst was simultaneously calcined and reduced at 500° C. for 1 hour under a continuous flow of 1 l/min Hydrogen inside the reaction vessel used for the batch experiments. O:C ratio of the product oil was determined using CHNS—O elemental analysis as described in example 2. O:C ratio of the product oil obtained in the absence of added catalyst was 0.170. In the presence of 4 g 5 wt % $Ni/Al_2O_3$ added catalyst without added $H_2$, the O:C ratio of the product oil was 0.133, or approximately a 22% relative improvement. In the presence of both 4 g 5 wt % $Ni/Al_2O_3$ added catalyst and also added $H_2$, the O:C ratio of the product oil was 0.125, or approximately a 26% relative improvement.

The embodiments and examples herein are descriptive only and not intended to limit the scope of the invention as defined by the claims.

REFERENCES

Alcala, A. and Bridgwater, A., "Upgrading fast pyrolysis liquids: Blends of biodiesel and pyrolysis oil," Fuel 109 (2013) 417-426

Alvira, P., et al. "Pretreatment technologies for an efficient bioethanol production process based on enzymatic hydrolysis: A review", Bioresource Technology (2010) 101: 4851

Aysu, T. et al., "Liquefaction of *Typha latifolia* by supercritical fluid extraction," Bioresource Technology 107 (2012) 464-470

Channiwala, S. and Parikh, P. "A unified correlation for estimating HHV of solid, liquid and gaseous fuels," Fuel 81 (2002) 1051

Cheng, S. et al., "Hydrothermal degradation of alkali lignin to bio-phenolic compounds in sub/supercritical ethanol and water-ethanol co-solvent," Polymer Degradation and Stability 97 (2012) 839-848

Guvenatam, B. et al. "Lewis-acid catalyzed depolymerization of Protobind lignin in supercritical water and ethanol," Catalysis Today 259 (2016) 460.

Huang, H. et al., "Thermochemical liquefaction of rice husk for bio-oil production with sub- and supercritical ethanol as solvent," Journal of Analytical and Applied Pyrolysis 102 (2013) 60-67

Huang, X. et al., "Catalytic depolymerization of lignin in supercritical ethanol," Chem Sus Chem 7 (2014) 2276-2288

Kim, J. et al. "Effects of various reaction parameters on solvolytical depolymerization of lignin in sub- and supercritical ethanol,' Chemosphere 93 (2013) 1755.

Kleinert, M. and Barth, T. "Towards a lignincellulosic biorefinery: Direct one-step conversion of lignin to hydrogen-enriched biofuel," Energy & Fuels 22 (2008) 1371-1379

Kleinert, M. et al., "Developing solvolytic conversion of lignin-to-liquid (LtL) fuel components: Optimization of quality and process factors," Cellulose Chem. Technol. 1-2 (2011) 3-12

Kuznetsov, B. et al. "Lignin conversion in supercritical ethanol in the presence of solid acid catalysts," Kinetics and Catalysis 56 (2015) 434.

Lehto, J. et al., "Review of fuel oil quality and combustion of fast pyrolysis bio-oils from lignocellulosic biomass," Applied Energy 116 (2014) 178-190

Martin, J. et al., "Maximizing the Stability of Pyrolysis Oil/Diesel Fuel Emulsions," Energy Fuels 28 (2014) 5918-5929

Sluiter, A.; Hames, B.; Ruiz, R.; Scarlata, C.; Sluiter, J.; Templeton, D.; Crocker, D., Determination of Structural Carbohydrates and Lignin in Biomass. *National Renewable Energy Laboratory, Report No. TP-*510-42618 2010.

Wang, X. et al., "Depolymerization of lignin with super-critical fluids: a review," Advanced Materials Research 821-822 (2013) 1126-1134

Yaginuma, R. et al., "Homogenizing effect of ethers added to immiscible methanol/oil binary mixtures," SEKIYU GAKKAISHI-JOURNAL OF THE JAPAN PETROLEUM INSTITUTE 44(6) (2001) 401-406

Ye, Y., et al., "Novel method for production of phenolics by combining lignin extraction with lignin depolymerization in aqueous ethanol," Ind. Eng. Chem. Res. 51 (2012) 103-110

The invention claimed is:

1. A process for production of liquid lignin fuel comprising the steps of:
   (i) providing lignin-rich solid residual from lignocellulosic biomass feedstock that has been hydrothermally pre-treated and subsequently subjected to cellulase enzyme hydrolysis,
   (ii) subjecting the lignin-rich solid residual to solvolysis in supercritical ethanol in the absence of an effective amount of added substance other than primary solvent which either acts as a hydrogen-donor reactant in hydrogenation of lignin residual during solvolysis, or which catalyses hydrogen-donor activity of the primary solvent, and in the absence of an effective amount of added hydrogen donor co-solvent, and in the absence of an effective amount of one or more supported or unsupported reduced metal or transition metal oxides, and in the absence of an effective of amount of added hydrogen gas ($H_2$); and
   (iii) recovering product oil from the liquid product of the alcohol reaction mixture as the separated heavy fraction having boiling point greater than 120° C. remaining after distillation of one or more light fractions having boiling point beneath 120° C.,
   wherein the water content, w/w ratio of solid to solvent, temperature and reaction period for solvolysis are selected so as to produce a product oil having O:C ratio of 0.20 or less.

2. The process of claim 1 conducted as a continuous process.

3. The process of claim 1 wherein the water content for solvolysis is within the range 0 to 15 wt %.

4. The process of claim 1 wherein the product oil is subject to further processing steps.

5. A method for processing lignin comprising the steps of:
   (i) providing pre-extracted lignin or lignin-rich solid residual from lignocellulosic biomass feedstock that has been hydrothermally pre-treated and subsequently subjected to cellulase enzyme hydrolysis, and
   (ii) subjecting the pre-extracted lignin or lignin-rich solid residual to solvolysis in super-critical ethanol, propanol or butanol at between 300° C. and 425° C. at a lignin:solvent ratio of 0.25 or greater.

6. The method of claim 5 conducted as a continuous process.

7. The method of claim 5 further comprising the step of recovering product oil from the liquid product of the alcohol reaction mixture as the separated heavy fraction having boiling point greater than 120° C. remaining after distillation of one or more light fractions having boiling point beneath 120° C.

8. The method of claim 7 wherein the O:C ratio of product oil is less than 0.20.

9. The method of claim 5 conducted in the absence of an effective amount of added reaction promoter.

10. The method of claim 5 wherein the water content for solvolysis is within the range 0 to 15 wt. %.

11. The process of claim 1 wherein a supercritical ethanol solvolysis is conducted using solvent comprising some fraction of solvent recycled from previous supercritical solvolysis reactions.

12. The process of claim 2 wherein the product oil is subject to further processing steps.

\* \* \* \* \*